(12) United States Patent
Thornton et al.

(10) Patent No.: US 6,426,970 B1
(45) Date of Patent: Jul. 30, 2002

(54) BI-DIRECTIONAL SIGNAL COUPLER METHOD AND APPARATUS

(75) Inventors: Barry Thornton; Jack E. Long, both of Austin, TX (US)

(73) Assignee: Clearcube Technology, Inc., Austin, TX (US)

( * ) Notice: Subject to any disclaimer, the term of this patent is extended or adjusted under 35 U.S.C. 154(b) by 0 days.

(21) Appl. No.: 09/175,671

(22) Filed: Oct. 20, 1998

(51) Int. Cl.$^7$ ................................. H04B 3/02
(52) U.S. Cl. ................ 375/220; 375/257; 375/285; 379/399; 370/284; 370/285; 333/24 R
(58) Field of Search ................. 375/220, 257, 375/285; 379/399; 370/284, 285; 333/24 R

(56) References Cited

U.S. PATENT DOCUMENTS 5,579,336 A * 11/1996 Fitzgerald et al. ........ 333/28 R
6,317,464 B1 * 11/2001 Le et al. ................ 375/257

* cited by examiner

*Primary Examiner*—Amanda T. Le
(74) *Attorney, Agent, or Firm*—Conley, Rose & Tayon PC

(57) ABSTRACT

A bi-directional signal coupler is incorporated into a transmission/reception communication system and is used for the transmission and reception of signals over a single transmission medium. The bi-directional signal coupler includes a primary nulling device for removing a signal to be transmitted through the bi-directional signal coupler from a signal to be received into the bi-directional signal coupler. The primary removing device provides an output signal representative of the signal to be received plus the signal to be transmitted wherein a level of the signal to be transmitted is removed to a first extent relative to a level of the signal to be received. At least one additional secondary device is provided for removing the signal to be transmitted from the signal to be received in a successive manner. The at least one additional secondary removing device operates upon the output signal of the primary removing device and is disposed for successively providing a further reduction in the level of the signal to be transmitted relative to the level of the signal to be received. A method of bi-directional signal coupling is also disclosed.

31 Claims, 4 Drawing Sheets

BI-DIRECTIONAL SIGNAL COUPLER METHOD AND APPARATUS

BACKGROUND OF THE INVENTION

1. Field of the Invention

The present method and apparatus generally relate to a system for the simultaneous transmission and reception of signals over a single transmission medium utilizing a common path for both transmission and reception, and more particularly, to a bi-directional signal coupler for use with the single transmission medium.

2. Discussion of the Related Art

In the field of radio frequency (RF) interconnections, there exists a strong need to have devices, referred to herein as bi-directional couplers, for coupling both a transmitter and a receiver to a single communication medium. In a typical bi-directional transmission/reception communication system 10 as shown in FIG. 1, a transmitter 12 and receiver 14 operate simultaneously and at the same frequency for sending and receiving signals, respectively, over the communication medium 16. In the latter instance, signals are only differentiated by the direction in which the respective signals are proceeding. A bi-directional coupler 18 couples transmitter 12 and receiver 14 to the communication medium 16. A second bi-directional coupler 20 couples a second receiver 22 and second transmitter 24 to communication medium 16. Signals transmitted by transmitter 12 are send across communication medium 16 and received by receiver 22. Similarly, signals transmitted by transmitter 24 are transmitted across communication medium 16 and received by receiver 14.

With reference still to FIG. 1, two bi-directional couplers 18 and 20 are shown connected to each other via the communication medium 16. The communication medium 16 can be either a wired communication medium or a wireless communication medium. An exemplary wire medium includes a current-conducting medium. An exemplary wireless medium includes the use of RF (radio frequency) waves transmitted and received over a non-conductive path such as air. Other communication mediums are also contemplated, including optical fiber and such mediums as may additionally require the use of encoders, decoders, modulators, and/or demodulators, or other devise(s) necessary to facilitate the use of or interface the bi-directional coupler with the actual medium.

Major disadvantages and/or problems which occur in bi-directional coupling devices (18, 20), such as illustrated in FIG. 1, include insertion loss, rejection ratio, and parts precision. Insertion loss can be characterized, for example, in terms of the amount of transmitted energy from transmitter 12 that gets through the bi-directional coupler 18 and onto the connecting communication medium 16. Insertion loss may likewise be characterized in terms of the amount of transmitted energy from transmitter 24 that gets through the bi-directional coupler 20 onto the communication medium 16. An insertion loss of zero decibels (0 dB) would be highly desirable, however, typical insertion loss is on the order of −10 dB. The insertion loss of 10 dB suggests an approximate ninety percent (90%) loss of power as a normal loss through a standard bi-directional coupler.

Rejection ratio is an attribute of a bi-directional coupling device and is characterized as a measure of how much of the signal which is transmitted via the transmit port is received by (i.e., comes out of) the receive port of the same bi-directional coupler. That is, with reference to FIG. 1, rejection ratio is characterized as a measure of an amount of signal from transmitter 12 which is delivered into receiver 14 from bi-directional coupler 18 will undesirably limit the detection range of receiver 14 with respect to signals present on medium 16 which are traveling toward receiver 14.

In connection with the rejection ratio, component parts precision plays a significant role. Parts precision can be characterized as the quality of rejection that results from balancing of an electronic bridge in the particular bi-directional coupler. The electronic bridge of a bi-directional coupler is highly dependent upon a precision of the components or component parts that make it up. Parts tolerance, especially over a temperature range, is therefore a critical factor to the maintaining of a high rejection quality.

With reference now to FIG. 2, a bridge 26 from a general class of bridges used in typical bi-directional coupler devices is illustrated. That is, with typical bi-directional coupler devices, a balanced bridge 26 is employed. With the use of the bridge 26, a bi-directional coupler operates in accordance with a process for nulling, removing, or subtracting a first signal, which is to be transmitted, in such a way as to only be able to detect a second signal, which is to be received. A typical manner for nulling the transmitted signal is to use a version of the transmitted signal to cancel itself at the receive output port of the bi-directional coupler, leaving only the incoming (received) signal at the receive output port. Variations of a bridge which can be used to provide less forward signal loss but otherwise still suffers from the limitations as discussed above, are shown in FIGS. 3A, 3B, and 3C, to be discussed further herein below.

With respect to FIG. 2, the bridge 26 is made up of resistive elements 28 (Z1) and 30 (Z2) for one side 32 (or "leg") of the bridge 26. A resistive element 34 (Z3) and a cable impedance 36 form the other side 38 (or "leg") of the bridge 26. A signal to be transmitted is coupled across nodes 40 and 42 of bridge 26. A signal to be received is detected across nodes 44 and 46.

With respect to FIG. 3A, bridge 50 is made up of resistive elements 52 (R2) and 54 (R3) for one side 56 (or leg) of the bridge. The resistive element 58 (R1) and a cable impedance 60 form the other side 62 (or leg) of the bridge 50. A signal to be transmitted (denoted "A") is input to bridge 50 at node 64. A signal to be received (denoted "B") is output from bridge 50 at node 66. Referring still to FIG. 3A, the signal to be transmitted is further coupled to a high input impedance buffer 68, and further coupled via an isolation transformer 70 (T1).

Turning now briefly to FIG. 3B, bridge 72 is similar to bridge 50 of FIG. 3A except for the presence of additional resistive elements 74, 76, 78 and 80. Resistive elements 82 and 84 contribute to one side 86 (or leg) of bridge 72. A resistive element 88 and a cable impedance (L/O line) 90 contribute to the other side 92 (or leg) of bridge 72. A signal to be transmitted (Tx) is input to bridge 72 at node 94. A signal to be received (Rx) is output from bridge 72 at node 96. Referring still to FIG. 3B, the signal to be transmitted (Tx) is further coupled to a resistive element 98, which is further coupled to isolation transformer 100 (T1).

With reference now to FIG. 3C, bridge 102 includes resistive and impedance elements. Winding 104 of isolation transformer 106 and resistive element 108 contribute to one side 110 (or leg) of bridge 102. Resistive elements 112, 114, and 116, winding 118 of isolation transformer 106, and the cable impedance 120 (I/O line) contribute to the other side 122 (or leg) of bridge 102. A signal to be transmitted (Tx) is input to bridge 102 at node 124. A signal to be received (Rx) is output from bridge 102 at node 126.

The above described method for nulling a transmitted signal in order to detect a received signal at a bi-directional coupler 18 ultimately requires the use of a bridge. In the above-mentioned illustrations in FIGS. 2, 3A, 3B, and 3C, the bridge is made up of resistive elements R2 (Z1) and R3 (Z2) for one side (or "leg") of the bridge, while the resistive element R1 (Z3) and a cable impedance form the other side (or "leg") of the bridge. In such a bridge, there is a practical limit to the amount of signal cancellation that can be achieved with the use of standard, commercially available, component parts. Due to inaccuracy in the component parts and the resultant imperfection of the nulling process within the bridge, the signal present at the receive output port of the bi-directional coupler consists of received signal B plus a small remaining amount of transmitted signal A. Typically, with the use of standard component parts, the amount of signal cancellation is on the order of 30–40 dB of rejection. In other words, the received output of a bi-directional signal coupler would contain a signal consisting of received signal B plus a small amount of transmitted signal A. In such case, about 1–3% of the transmitted signal A will appear at the receive output port 14 of the bi-directional coupler.

The above described methods of nulling with respect to FIGS. 2 and 3 have significant limitations. For instance, the above methods suffer from insertion loss. For all practical purposes, in FIG. 2, impedance element 34 (Z3) is in series with the signal to be transmitted. Some of the energy to be transmitted is thus dissipated across impedance element 34 (Z3). As a result, a loss is created in the signal (Tx) transmitted to the cable 36.

With respect to the rejection ratio, the quality of rejection is a direct function of the balance of the particular bridge. Any variations in the balance of the bridge, as achieved in accordance with the accuracy of the component parts, will directly affect the level of rejection. If all impedance/ resistive values of the bridge components are allowed a tolerance of not less than one percent (1%) of the value(s) required to achieve a perfect balance of the bridge, then transmitted signal A appearing at receive output port 14 will be reduced by not more than approximately 40 dB relative to the amplitude of transmitted signal A input to the bi-directional coupler at port 12.

Considering briefly the issue of manufacture, maintaining a given high rejection quality, especially for use over a temperature range, at a reasonable cost is quite difficult. High precision component parts which maintain their component values to high precision over a temperature range are available at high cost, thus when used in the manufacture of a bi-directional coupler, only adds to the cost of manufacture.

A primary disadvantage of the prior methods and apparatus for nulling the transmitted signal within a bi-directional coupler relates to the difficulty in achieving a substantial and reliable null of the transmitted signal at the receive output port, as well as manufacturing and component parts cost. An improved bi-directional coupler is thus desired.

SUMMARY OF THE INVENTION

The present method and apparatus solve the problems in the art by offering greater rejection with very little insertion loss, while being able to be constructed from medium tolerance component parts.

According to one embodiment of the present disclosure, a bi-directional signal coupler apparatus for the transmission and reception of signals over a single transmission medium includes a primary means for removing the transmitted signal from the received signal and at least one additional secondary means for removing the transmitted signal from the received signal. The primary means performs a first pass removal of the transmitted signal from the received signal. The primary nulling means also provides an output signal representative of the signal to be received plus the signal to be transmitted removed to a first extent from the signal to be received. The at least one additional secondary means performs a second pass removal of the signal to be transmitted from the received signal, wherein the at least one additional secondary nulling means further reduces the amount of transmitted signal present at the receive output port of the bi-directional coupler.

According to another embodiment of the present disclosure, a bi-directional transmission/reception communication system includes first and second bi-directional transmission/reception signal couplers and a single transmission medium disposed between the first and second bi-directional transmission/reception signal couplers for the transmission and reception of signals over the single transmission medium. In the bi-directional transmission/ reception communication system, the first bi-directional coupler includes a primary means for performing a first pass removal of the transmitted signal, traveling through the first bi-directional signal coupler toward the single transmission medium from the signal to be received. The primary means further provides an output signal representative of the signal to be received, plus the signal to be transmitted removed to a first extent. In addition, at least one additional secondary means is provided for performing a second pass removal of the transmitted signal from the signal to be received, wherein the at least one additional secondary means operates upon the output signal of the primary means and is selected to achieve a desired further reduction in the amplitude of the transmitted signal appearing at the receive output port of the first bi-directional coupler.

Still further, according to yet another embodiment of the present disclosure, a method for bi-directional signal coupling the transmission and reception of signals over a single transmission medium is disclosed. The bi-directional coupling method includes the steps of providing a primary means for removing a signal to be transmitted, traveling through a bi-directional signal coupler, from a signal to be received. The primary means further provides an output signal which is representative of the signal to be received, plus the signal to be transmitted removed to a first extent. The method further includes the step of providing a secondary means for removing the signal to be transmitted from the signal to be received. The secondary means operates upon the output signal produced by the primary means and is selected to achieve a desired further reduction in the amplitude of the transmitted signal relative to the signal to be received. The method still further includes the step of providing at least one additional secondary means for removing the signal to be transmitted from the signal to be received. The at least one additional secondary means operates upon an output signal produced by the first secondary means and is selected to achieve a desired further reduction in the amplitude of the transmitted signal appearing at the receive output port of the bi-directional coupler.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings, in which.

DETAILED DESCRIPTION OF THE PREFERRED EMBODIMENTS

The present method and apparatus are an improvement over that which has been done in the past. The present method and apparatus achieve bi-directional coupling without resort to extreme parts selection and fabrication techniques. As will be discussed herein, the present embodiment includes a bi-directional signal coupler having circuitry for successive and multiple removal or subtraction of a signal to be transmitted from a signal to be received. One example of a multiple removal embodiment is functionally illustrated in FIG. 4.

Figure 4:
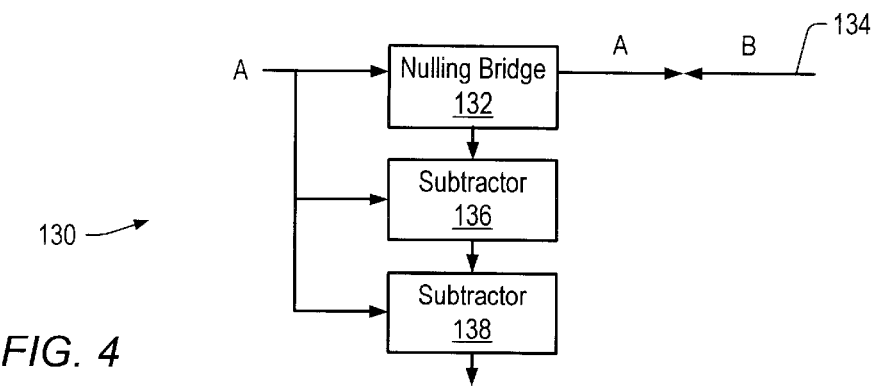
FIG. 4 illustrates a block diagram representation of a bi-directional signal coupler multiple nulling (subtraction) embodiment of the present method and apparatus.
Figure 5:
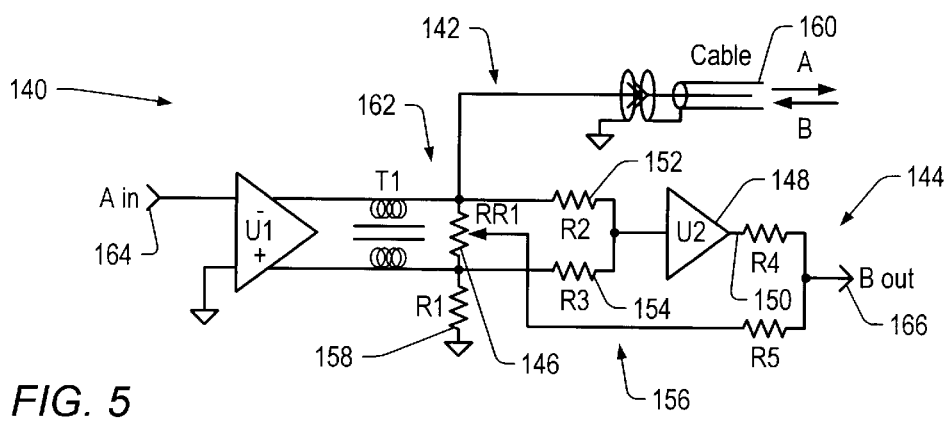
FIG. 5 illustrates a circuit diagram of a bi-directional signal coupler according to one embodiment of the present method and apparatus.

With reference to FIG. 4, according to one embodiment, the bi-directional signal coupler 130 includes a nulling bridge 132. Signal A is intended to be transmitted onto the communication medium 134 from the bi-directional signal coupler 130. The bridge 132 performs, or carries out, a first removal of signal A from signal B. As a result, signal A is removed, to a certain degree, from a received signal B coming into the bi-directional coupler 130 via the communication medium 134. The resultant signal consisting of signal B, plus signal A removed to a certain extent, is then input into a first subtractor 136, which further reduces an amplitude of signal A. The output signal from subtractor 136 is input to subtractor 138, where additional signal A is removed. Additional subtractions may be implemented as required to achieve a desired specific reduction of signal A. Following each subtraction, a gain stage can be employed (as shown in FIG. 5) in order to compensate for any undesired signal loss through the subtractor and to provide a signal of reasonable working level as may be defined by considerations for signal-to-noise requirements and/or other parameters. As. signals are processed through successive stages of the bi-directional coupler from the output of bridge 132 (FIG. 4) toward the output of subtractor 138, the ratio of the level of signal A to the level of signal B diminishes. Through repeated subtraction and amplification as described above, the bi-directional coupler returns a substantially pure version of signal B at the receive output port while transferring signal A essentially intact to the communication medium.

With reference now to FIG. 5, a circuit diagram of a bi-directional coupler 140 of the present embodiment for carrying out the method and apparatus is shown. Bi-directional coupler 140 includes a bridge 142 and a passive subtractor 144. Passive subtractor 144 follows bridge 142. Adjusting resistor 146 (RR1) permits choosing both amplitude and phase (0°, 180°) of signal A in such a way that a modified version of signal A may be forwarded to subtractor 144 and utilized to cancel, or remove, a portion of signal A traveling toward the receive output port of the bi-directional coupler. Subtractor 144 further includes resistive elements R4 and R5 as shown in FIG. 5. Amplifier 148 (U2) amplifies and buffers the output of bridge 142 so that second removal of signal A within subtractor 144 is performed at a high level, moderating the accuracy required of the component parts while simultaneously increasing the level of signal B with respect to signal A. To summarize, the general function of circuitry illustrated in FIG. 5, if it is assumed that the level of signal A is reduced by 30 dB within bridge 142, and that the level of signal A is further reduced by 30 dB within subtractor 144, then the circuit of FIG. 5 as a whole will have reduced the signal A traveling towards the receive output port of the bi-directional coupler by 60 dB.

With reference still to FIG. 5, bi-directional coupler 140 includes bridge 142. Bridge 142 is made up of resistive elements 152 (R2) and 154 (R3) for one side 156 (or leg) of the bridge. The resistive element 158 and a cable impedance 160 from the other side 162 (or leg) of bridge 142. A signal to be transmitted by bi-directional coupler 140 (denoted "A") is input to the bridge 142 at node 164. A signal to be received by bi-directional coupler 140 (denoted "B") is output from the bridge 142 and passive subtractor 144 at node 166.

Figure 6:
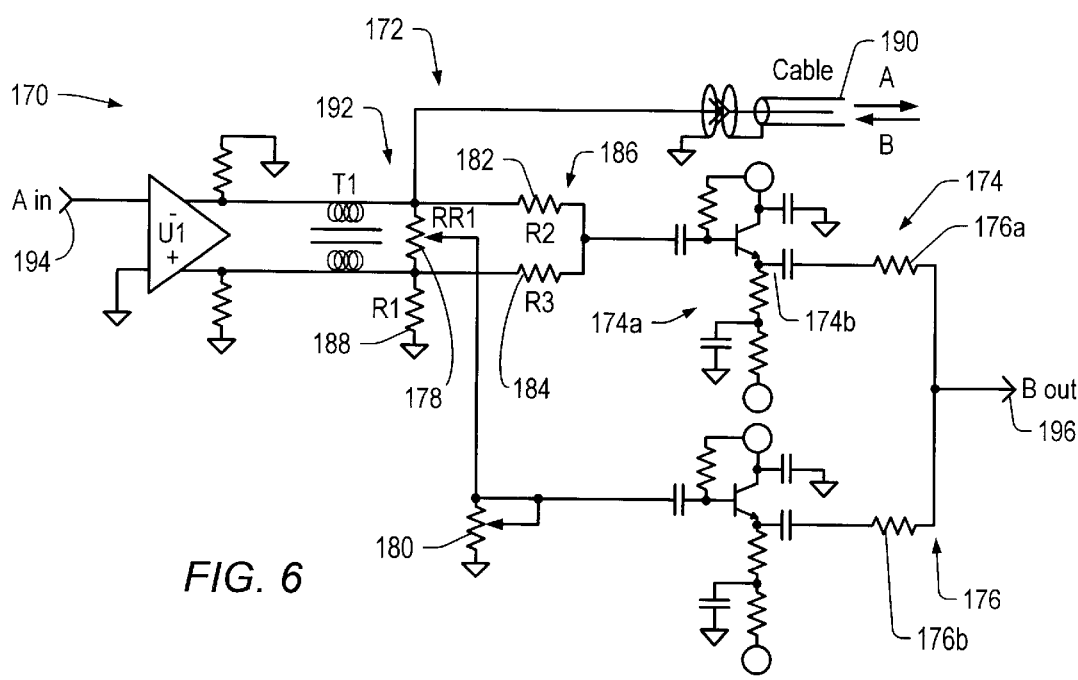
FIG. 6 illustrates a circuit diagram of a bi-directional signal coupler according to another embodiment of the present method and apparatus.

Another alternate embodiment of a bi-directional coupler 170 according to the present disclosure is illustrated in FIG. 6. With FIG. 6, bi-directional coupler 170 is similar to bi-directional coupler 140 of FIG. 5 with the following differences as noted. A primary bridge 172 is followed by a buffer 174 and a subtractor 176. Adjusting the resistors 178 and 180 permits choosing both amplitude and phase (0°, 180°) of signal A in such a way that a modified version of signal A may be forwarded to subtractor 176 and utilized to cancel, or remove, a portion of signal A traveling toward the receive output port of the bi-directional coupler. Subtractor 176 includes resistive elements 176a and 176b.

Bi-directional coupler 170 includes primary bridge 172. Primary bridge 172 is made up of resistive elements 182 (R2) and 184 (R3) for one side 186 (or leg) of the primary bridge 172. The resistive element 188 and a cable impedance 190 form the other side 192 of primary bridge 172. A signal to be transmitted (denoted "A") is input to the primary bridge 172 at node 194. A signal to be received by bi-directional coupler 170 (denoted "B") is output from the primary bridge 172 and subtractor 176 at node 196.

Figure 7:
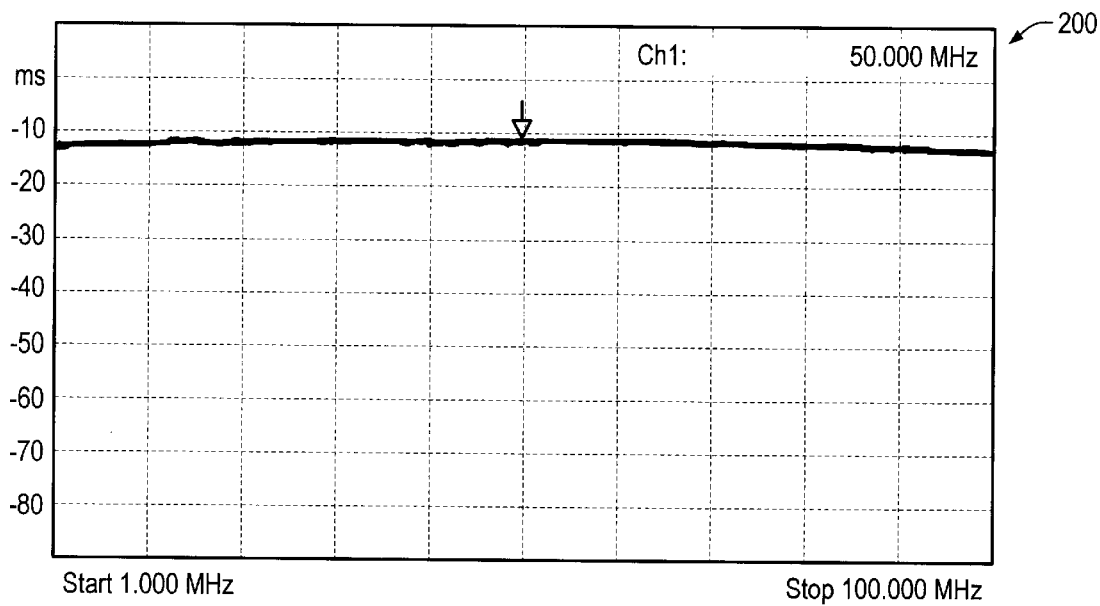
FIG. 7 illustrates a performance plot of the bi-directional signal coupler of FIG. 6.
Figure 8:
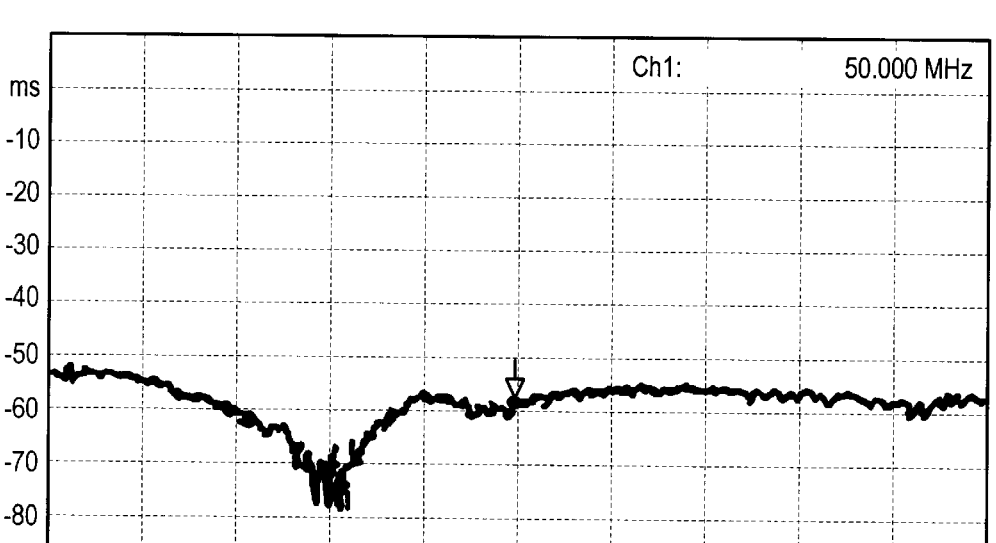
FIG. 8 illustrates another performance plot of the bi-directional signal coupler of FIG. 6.

Data has been obtained for evaluating a performance of the circuit of FIG. 6, such as shown in performance plots 200 and 202 of FIGS. 7 and 8, respectively. The performance plot 200 of FIG. 7 is the B signal inputted at a 0-dB level appearing at the B output port 196. This signal is attenuated by a total of 12 dB, 6 dB at node 174b of FIG. 6 (output of the buffer amplifier which follows bridge 172), and an additional 6 dB at node 196 (bi-directional coupler receive port output).

FIG. 8 illustrates the signal appearing at the B signal output point (receive output port, node 196) of FIG. 6 when only the A signal to be transmitted is input to the b bi-directional coupler at node 194. The A signal level output to cable 190 is 0 dB, but as can be seen in FIG. 8, the A signal level appearing at the receive output port of the bi-directional coupler is attenuated by not less than 50 dB, and in certain areas of the passband this attenuation exceeds 70 dB. Note that a comparison of the level of signal A input to the coupler at node 194 (FIG. 6) to the level of signal A output to cable 190 indicates 0 dB loss.

Figure 1:
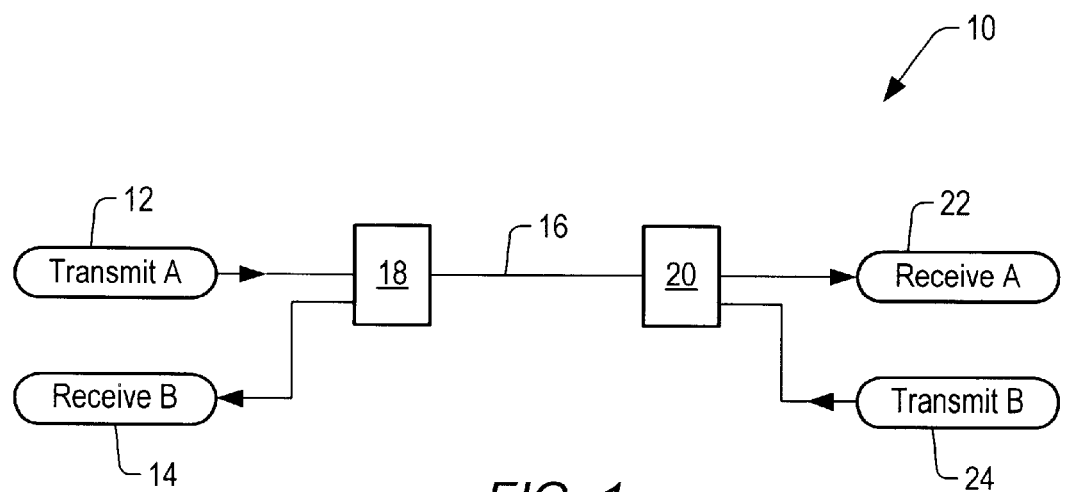
FIG. 1 illustrates an exemplary bi-directional communication system.
Figure 2:
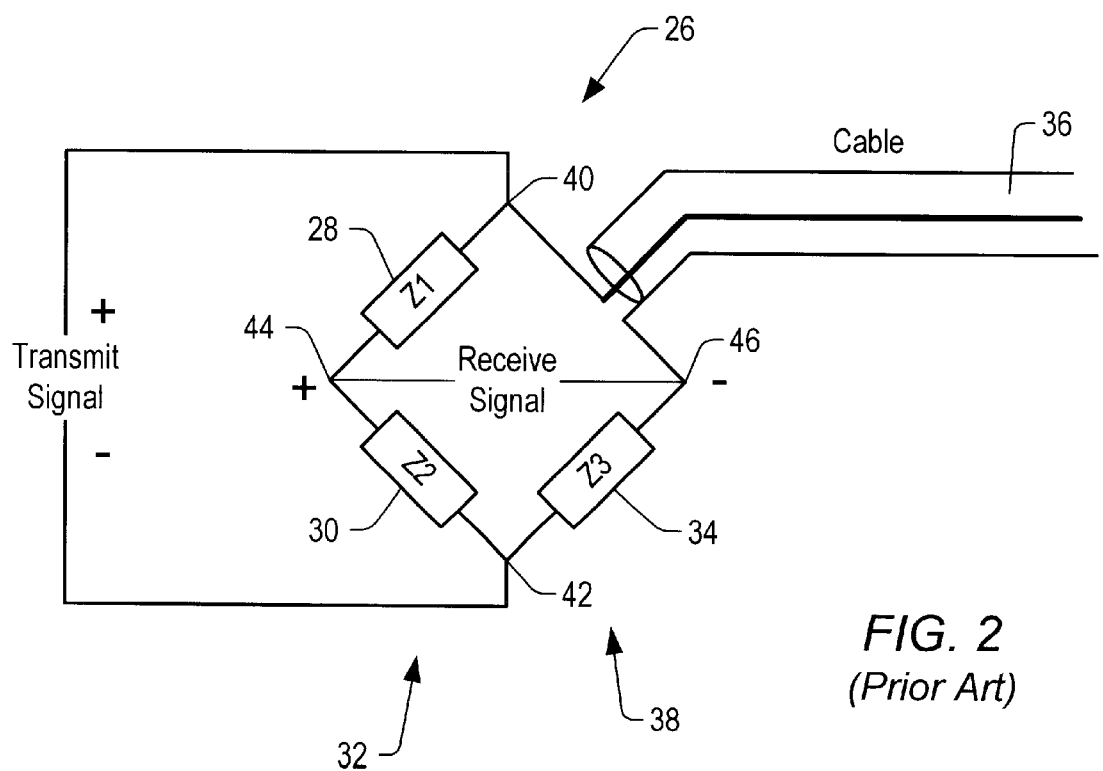
FIG. 2 illustrates a typical bi-directional signal coupler device including a general class of bridge.
Figure 3A:
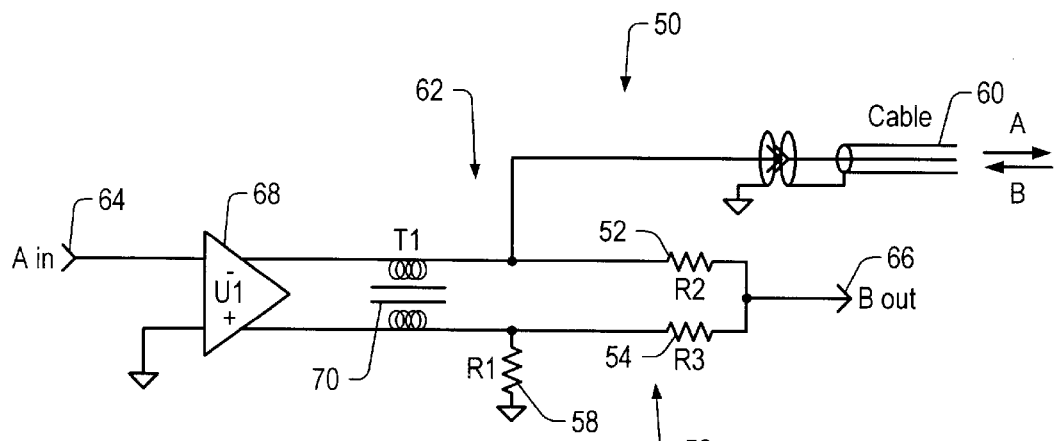
FIG. 3A, 3B, and 3C illustrate various known bridging schemes used with bi-directional signal couplers.
Figure 3B:
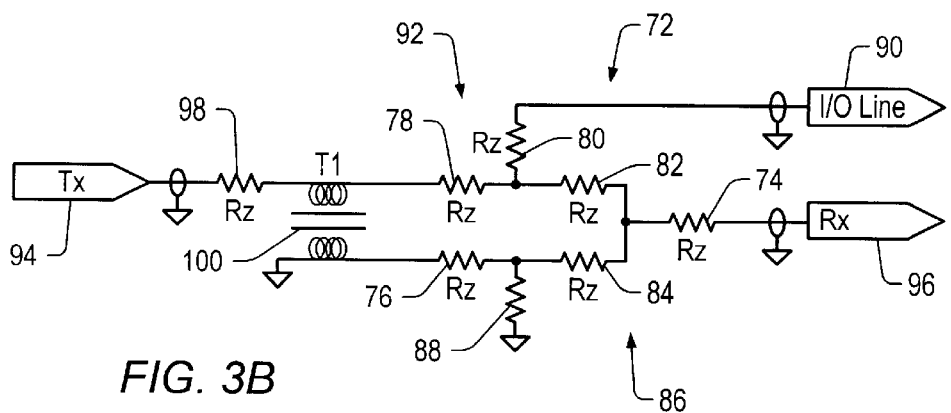
Figure 3C:
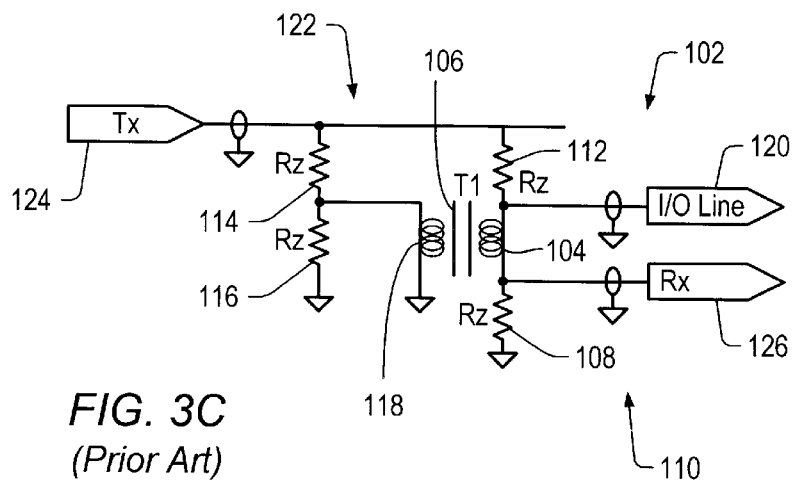

Novel features of the method and apparatus of the present embodiment include the employing of multiple nulling or subtracting stages. The use of multiple nulling stages provides a profound and thorough nulling process. The bi-directional coupler of FIGS. 4, 5, and 6 according to the present disclosure can be incorporated into a communications system, similar to that as shown in FIG. 1, to provide an improved bi-directional transmission and reception communication system. In addition, the present embodiment provides the ability to achieve profound and thorough nulling without careful component selection or the need for low tolerance (value or temperature) components. Still further, the present embodiment provides the ability to achieve stable nulling employing low levels of manufacturing sophistication.

While the invention has been particularly shown and described with reference to the preferred embodiment thereof, it will be understood by those skilled in the art that various changes in form and detail may be made therein without departing form the spirit and scope of the invention, as set forth in the following claims.

What is claimed is:

1. A bi-directional signal coupler apparatus for the transmission and reception of signals over a single transmission medium utilizing a common path for both transmission and reception, said bi-directional coupler comprising:

a primary means for removing a signal to be transmitted through said bi-directional signal coupler from a signal to be received into said bi-directional signal coupler, said primary removing means providing an output signal representative of the signal to be received plus the signal to be transmitted wherein a level of the signal to be transmitted is removed to a first extent relative to a level of the signal to be received; and at least one additional secondary means for removing the signal to be transmitted from the signal to be received in a successive manner, wherein said at least one additional secondary removing means operates upon the output signal of said primary removing means and is disposed for successively providing a further reduction in the level of the signal to be transmitted relative to the level of the signal to be received.

2. The bi-directional coupler apparatus of claim 1, wherein said primary removing means includes a bridge.

3. The bi-directional coupler apparatus of claim 2, wherein said at least one additional secondary removing means includes a first subtractor, the first subtractor providing an output signal representative of the signal to be received plus the signal to be transmitted, wherein the level of the signal to be transmitted relative to the level of the signal to be received is successively reduced by the first extent and a second extent.

4. The bi-directional coupler apparatus of claim 3, wherein said at least one additional secondary removing means further includes a second subtractor, the second subtractor operating upon the output signal of the first subtractor and providing an output signal representative of the signal to be received plus the signal to be transmitted, wherein the level of the signal to be transmitted relative to the level of the signal to be received is further successively reduced by a third extent.

5. The bi-directional coupler apparatus of claim 1, further comprising:

means for amplifying the output signal of said primary removing means to a prescribed working level prior to the output signal being operated upon by said at least one additional secondary removing means.

6. The bi-directional coupler apparatus of claim 1, wherein said at least one additional secondary removing means includes a variable resistive element, the variable resistive element being adjustable to permit choosing both an amplitude and a phase (0°,180°) of the signal to be transmitted in such a way as to provide a version of the signal to be transmitted which is suitable to serve as a subtractive signal element within a respective at least one secondary removing means.

7. The bi-directional coupler apparatus of claim 1, wherein said at least one additional secondary removing means includes a first subtractor and a second subtractor, wherein the first subtractor operates upon the output signal of the primary removing means and the second subtractor operates upon an output signal of the first subtractor.

8. The bi-directional coupler apparatus of claim 7, wherein the level of the signal to be transmitted relative to the level of the signal to be received is successively reduced to the first extent by said primary removing means, a second extent by the first subtractor, and a third extent by the second subtractor.

9. The bi-directional coupler apparatus of claim 7, wherein the first subtractor includes a variable resistive element, the variable resistive element being adjustable to permit choosing both an amplitude and a phase (0°,180°) of the signal to be transmitted in such a way as to provide a version of the signal to be transmitted which is suitable to serve as a subtractive signal element within the first subtractor.

10. The bi-directional coupler apparatus of claim 8, further wherein the second subtractor includes a variable resistive element, the variable resistive element being adjustable to permit choosing both an amplitude and a phase (0°,180°) of the signal to be transmitted in such a way as to provide a version of the signal to be transmitted which is suitable to serve as a subtractive signal element within the second subtractor.

11. A bi-directional transmission/reception communication system comprising:

first and second bi-directional transmission/reception signal couplers; and
a single transmission medium disposed between said first and second bi-directional transmission/reception signal couplers for the transmission and reception of signals over said single transmission medium, wherein said first bi-directional coupler includes a primary means for removing a signal to be transmitted through said first bi-directional signal coupler from a signal to be received into said first bi-directional signal coupler, said primary removing means providing an output signal representative of the signal to be received plus the signal to be transmitted wherein the level of a signal to be transmitted is removed to a first extent relative to a level of the signal to be received, and at least one additional secondary means for removing the signal to be transmitted from the signal to be received in a successive manner, wherein said at least one additional secondary removing means operates upon the output signal of said primary removing means and is disposed for successively providing a further reduction in the level of the signal to be transmitted relative to the level of the signal to be received.

12. The bi-directional transmission/reception communication system of claim 11, wherein said primary removing means includes a bridge.

13. The bi-directional transmission/reception communication system of claim 12, wherein said at least one additional secondary removing means includes a first subtractor, the first subtractor providing an output signal representative of the signal to be received plus the signal to be transmitted, wherein the level of the signal to be transmitted relative to the level of the signal to be received is successively reduced by the first extent and a second extent.

14. The bi-directional transmission/reception communication system of claim 13, wherein said at least one additional secondary removing means further includes a second subtractor, the second subtractor operating upon the output signal of the first subtractor and providing an output signal representative of the signal to be received plus the signal to be transmitted, wherein the level of the signal to be transmitted relative to the level of the signal to be received is further successively reduced by a third extent.

15. The bi-directional transmission/reception communication system of claim 11, further comprising:
    means for amplifying the output signal of said primary removing means to a prescribed working level prior to the output signal being operated upon by said at least one additional secondary removing means.

16. The bi-directional transmission/reception communication system of claim 11, wherein said at least one additional secondary removing means includes a variable resistive element, the variable resistive element being adjustable to permit choosing both an amplitude and a phase (0°,180°) of the signal to be transmitted in such a way as to provide a version of the signal to be transmitted which is suitable to serve as a subtractive signal element within a respective at least one secondary removing means.

17. The bi-directional transmission/reception communication system of claim 11, wherein said at least one additional secondary removing means includes a first subtractor and a second subtractor, wherein the first subtractor operates upon the output signal of the primary removing means and the second subtractor operates upon an output signal of the first subtractor.

18. The bi-directional transmission/reception communication system of claim 17, wherein the level of the signal to be transmitted relative to the level of the signal to be received is successively reduced to the first extent by said primary removing means, a second extent by the first subtractor, and a third extent by the second subtractor.

19. The bi-directional transmission/reception communication system of claim 17, wherein the first subtractor includes a variable resistive element, the variable resistive element being adjustable to permit choosing both an amplitude and a phase (0°,180°) of the signal to be transmitted in such a way as to provide a version of the signal to be transmitted which is suitable to serve as a subtractive signal element within the first subtractor.

20. The bi-directional transmission/reception communication system of claim 18, further wherein the second subtractor includes a variable resistive element, the variable resistive element being adjustable to permit choosing both an amplitude and a phase (0°,180°) of the signal to be transmitted in such a way as to provide a version of the signal to be transmitted which is suitable to serve as a subtractive signal element within the second subtractor.

21. A method for bi-directional signal coupling the transmission and reception of signals over a single transmission medium using a common path for both transmission and reception, said bi-directional coupling method comprising the steps of:

providing a primary means for removing a signal to be transmitted through a bi-directional signal coupler from a signal to be received into the bi-directional signal coupler, the primary removing means providing an output signal representative of the signal to be received plus the signal to be transmitted, wherein a level of the signal to be transmitted is removed to a first extent relative to a level of the signal to be received; and providing at least one additional secondary means for removing the signal to be transmitted from the signal to be received in a successive manner, wherein the at least one additional secondary removing means operates upon the output signal of the primary removing means and is disposed for successively providing a further reduction in the level of the signal to be transmitted relative to the level of the signal to be received.

22. The bi-directional signal coupling method of claim 21, wherein said step of providing a primary removing means includes providing a bridge.

23. The bi-directional signal coupling method of claim 22, wherein said step of providing at least one additional secondary removing means includes providing a first subtractor, the first subtractor having an output signal representative of the signal to be received plus the signal to be transmitted, wherein the level of the signal to be transmitted relative to the level of the signal to be received is successively reduced by the first extent and a second extent.

24. The bi-directional signal coupling method of claim 23, wherein said step of providing at least one additional secondary removing means further includes providing a second subtractor, the second subtractor operating upon the output signal of the first subtractor and having an output signal representative of the signal to be received plus the signal to be transmitted, wherein the level of the signal to be transmitted relative to the level of the signal to be received is further successively reduced by a third extent.

25. The bi-directional signal coupling method of claim 21, further comprising the step of:
    providing means for amplifying the output signal of the primary removing means to a prescribed working level prior to the output signal being operated upon by the at least one additional secondary removing means.

26. The bi-directional signal coupling method of claim 21, wherein said step of providing at least one additional secondary removing means includes providing a variable resistive element, the variable resistive element being adjustable to permit choosing both an amplitude and a phase (0°,180°) of the signal to be transmitted in such a way as to provide a version of the signal to be transmitted which is suitable to serve as a subtractive signal element within a respective at least one secondary removing means.

27. The bi-directional signal coupling method of claim 21, wherein said step of providing at least one additional secondary removing means includes providing a first subtractor and a second subtractor, wherein the first subtractor operates upon the output signal of the primary removing means and the second subtractor operates upon an output signal of the first subtractor.

28. The bi-directional signal coupling method of claim 27, wherein the level of the signal to be transmitted relative to the level of the signal to be received is successively reduced to the first extent by the primary reducing means, a second extent by the first subtractor, and a third extent by the second subtractor.

29. The bi-directional signal coupling method of claim 27, wherein the first subtractor includes a variable resistive element, the variable resistive element being adjustable to permit choosing both an amplitude and a phase (0°,180°) of the signal to be transmitted in such a way as to provide a version of the signal to be transmitted which is suitable to serve as a subtractive element within the first subtractor.

30. The bi-directional signal coupling method of claim 28, further wherein the second subtractor includes a variable resistive element, the variable resistive element being adjustable to permit choosing both an amplitude and a phase (0°,180°) of the signal to be transmitted in such a way as to provide a version of the signal to be transmitted which is suitable to serve as a subtractive element within the second subtractor.

31. A bi-directional signal coupler for the transmission and reception of signals over a single transmission medium utilizing a common path for both transmission and reception, said bi-directional coupler comprising:

a bridge circuit for removing a signal to be transmitted through said bi-directional signal coupler from a signal to be received into said bi-directional coupler, said bridge circuit providing an output signal representative of the signal to be received plus the signal to be transmitted, wherein a level of the signal to be transmitted is removed to a first extent relative to a level of the signal to be received; and at least one additional secondary circuit for removing the signal to be transmitted from the signal to be received in a successive manner, wherein said at least one additional secondary circuit operates upon the output signal of said bridge circuit and is disposed for successively providing a further reduction in the level of the signal to be transmitted relative to the level of the signal to be received.

* * * * *